United States Patent [19]

Warren

[11] Patent Number: 5,194,859
[45] Date of Patent: Mar. 16, 1993

[54] APPARATUS AND METHOD FOR POSITIONING A TOOL IN A DEVIATED SECTION OF A BOREHOLE

[75] Inventor: Tommy M. Warren, Coweta, Okla.

[73] Assignee: Amoco Corporation, Chicago, Ill.

[21] Appl. No.: 642,487

[22] Filed: Feb. 8, 1991

Related U.S. Application Data

[63] Continuation of Ser. No. 538,793, Jun. 15, 1990, abandoned.

[51] Int. Cl.[5] .............................................. G01V 1/00
[52] U.S. Cl. .............................. 340/853.4; 340/853.8; 340/854.1; 175/45; 33/304; 33/313
[58] Field of Search ................. 33/302, 303, 304, 313; 175/45, 50; 340/853.4, 853.8, 854.1

[56] References Cited

U.S. PATENT DOCUMENTS

| | | | |
|---|---|---|---|
| 4,399,692 | 8/1983 | Hulsing, II et al. | 73/151 |
| 4,457,370 | 7/1984 | Wittrisch | 166/250 |
| 4,614,040 | 9/1986 | Hulsing, II et al. | 33/312 |
| 4,901,804 | 2/1990 | Thometz et al. | 166/66 |
| 5,064,006 | 11/1991 | Waters et al. | 175/50 |

OTHER PUBLICATIONS

"Arco drills horizontal drainhole for better reservoir placement," W. D. Moore III; *Oil & Gas Journal*; Sep. 15, 1980.

"New interest in drainhole drilling revives technology," D. R. Holbert; *World Oil*, Mar. 1981.

Primary Examiner—J. Woodrow Eldred
Attorney, Agent, or Firm—James A. Gabala; Richard A. Kretchmer; Frank J. Sroka

[57] ABSTRACT

Apparatus and method for positioning a tool, such as a surveying instrument, in the deviated section of a borehole includes a flexible rod and a positioning assembly. The flexible rod extends from the vertical section into the deviated section of the borehole with the tool being connected to the downhole end of the rod. The positioning assembly is connected to the uphole end of the rod for positioning the downhole end of the rod in the deviated section of the borehole when the positioning assembly and the uphole end of the rod are in the vertical section of the borehole. In one embodiment, the positioning assembly is a biasing assembly, such as a weight, for urging the downhole end of the rod and tool into the deviated section. In another embodiment, the positioning assembly is an orienting assembly for rotationally orienting the rod and tool in the borehole as the rod is lowered into the borehole. The orienting assembly also provides for fixing the rotational orientation of the rod and tool with respect to a predetermined point on the circumference of the drillstring and limiting the downhole travel of the rod and tool as the rod is lowered into the drillstring.

6 Claims, 3 Drawing Sheets

APPARATUS AND METHOD FOR POSITIONING A TOOL IN A DEVIATED SECTION OF A BOREHOLE

This is a continuation of copending application Ser. No. 538,793 filed Jun. 15, 1990, now abandoned.

BACKGROUND OF THE INVENTION

1. Field of the Invention

This invention relates to apparatus and method for surveying and logging deviated boreholes and, more particularly, but not by way of limitation, to apparatus and method used for positioning surveying, logging, and other tools in highly deviated boreholes and boreholes with a short radius curve.

2. Setting of the Invention

In order to enhance the recovery of subterranean fluids, such as oil and gas, it is sometimes desirable to steer the direction of the well bore or borehole. In an oil producing formation or strata which has limited vertical depth and relatively greater horizontal extent, a well which extends laterally or horizontally through the oil producing formation may be more productive than one extending vertically. In order to create a deviated, e.g., skewed or horizontal, borehole it is necessary to steer the drilling bit at the end of the drill string from the general vertical orientation in which such wells are normally drilled to a horizontal or lateral orientation.

In steering a drill bit from a vertical orientation to a deviated orientation, it is necessary to deflect the drill bit from the generally vertical borehole to the deviated direction. The initial deflecting step is also known as "kicking off" the well or borehole. It is typical to first drill a vertical borehole and then attempt to deflect the drill bit and drill string through the wall of the vertical borehole. Normally the deviated section of the borehole will "kick off" from the vertical section of the borehole with a curved section of borehole. The borehole will be "curved" until the desired inclination is obtained and then the borehole will be extended as desired in the inclined (or "deviated"), lateral direction. A borehole or a section of a borehole is considered "highly" deviated when an instrument or tool will not travel into the deviated section under the instrument's own weight, otherwise the borehole is considered to be about vertical. This usually occurs when the deviated section has an inclination of approximately 55 degrees or more, measured from a vertical axis. Highly deviated boreholes often are initiated by a curved section of borehole having a short radius ("short radius curve"), i.e., having a radius of curvature between ten and 100 feet.

Several types of tools have been developed to kick off the drill bit and drill string from the vertical section of the borehole and create the deviated section of the borehole. The whipstock, razorback, eccentric collar, and similar tools are used to guide the direction of the drill bit as the drilling progresses in the deviated section of the borehole. As drilling progresses in the deviated section, it is essential to monitor the direction, i. e., north, south, east, west, as well as the inclination of the deviated section in order to determine when directional changes need to be made. Various surveying instruments have been developed which may be placed in the deviated section of the borehole in order to monitor or "survey" the direction and inclination of the borehole. One tool is disclosed in U.S. Pat. No. 4,807,717 which utilizes a collar on the logging tool to be caught by a special collar catcher on the end of the drill string. The borehole is then logged while the drill string is withdrawn from the borehole. Other systems that are commercially available include Institut Francais Du Petrole's "SIMPHOR", Halliburton (Gearhart) Logging Service's "TOOL PUSHER", Atlas' "SLANT-HOLE EXPRESS" and Welex's "PLS".

However, problems are encountered when attempting to survey, log, or otherwise insert tools into boreholes, particularly highly deviated boreholes and short radius curves. Highly deviated boreholes present a surveying problem because of their high angle of deviation and the high curvature of the curved section. Vertical boreholes, low deviation boreholes, and any initial, low deviation section of the curved section of a highly deviated borehole or short radius curve can be surveyed by lowering the surveying instrument via wireline into the borehole; but the instrument will not slide into the deviated section under its own weight beyond inclinations of about 55 degrees from vertical. At inclinations greater than 55 degrees, the tool or instrument must be pushed or somehow forced into the deviated section or lateral extension of the borehole.

A common prior method for surveying short radius curves or highly deviated boreholes conveys the surveying instrument at the end of a non-magnetic (such as aluminum or stainless stell) spacer attached to a string of flexible steel drill pipe (or collars). The method entails removing the drill string from the borehole, attaching the survey assembly to the drill string, tripping (moving) the drill string and survey assembly into and out of the borehole, removing the survey assembly, and tripping the drill string back into the borehole. This makes surveying, logging, or otherwise placing tools in a highly deviated or short radius curve borehole a time consuming operation which detracts from the efficiency of the drilling of highly deviated boreholes. The most common complaint about short radius or highly deviated drilling is the inordinate time devoted to surveying the borehole.

Flexible or wiggly pipe is made specifically for drilling and is not particularly appropriate or ideal for moving instruments or tools into and out of boreholes. In surveying applications, wiggly pipe is unnecessarily heavy, is overdesigned strength-wise, and its ability to conduct fluid is not needed. Also, wiggly pipe is a relatively expensive specialty drilling tool which undergoes needless wear and tear and is exposed to unnecessary risk of loss downhole whenever it is used for surveying highly deviated boreholes.

Another problem encountered with highly deviated boreholes or boreholes having short radius curves is that there are no survey instruments sufficiently small to be run through the bore of the flexible pipe or wiggly collars used for drilling the short radius curve. When a deviated borehole or short radius curve is being drilled, it is desirable to take surveys immediately above the drill bit as the curve drilling progresses in order to: (1) determine the best orientation of the kick off tool for directional control, (2) to tell if the curve drilling is progressing normally, and (3) to determine when to pull the curve drilling assembly and replace it with a lateral drilling assembly. In practice, the curve drilling assembly is pulled from the borehole one or more times during drilling of the deviated section in order to perform these functions. Each time this is done, valuable rig time is wasted and the curve drilling assembly must be reoriented when replaced in the borehole.

Another problem with surveying short radius curves is that they are often drilled through the side wall of steel casing. The proximity to the casing precludes the use of any surveying instrument that utilizes magnetic techniques to determine the borehole direction. This is true even if the drill string is tripped out of the hole. Thus, the surveying must be accomplished with "gyro" type surveying instruments which are more expensive and time consuming to operate than magnetic instruments. There are no "gyro" instruments that are small enough to pass through the inside diameter of the wiggly pipe.

Therefore, there is a need for an apparatus and method which will allow a surveying instrument, logging instrument, or other downhole tool to be positioned in the deviated section or short radius curve of a borehole without requiring the use of the drill string to move the instrument into the deviated section; which is non-magnetic i.e., which will not interfere with magnetic instruments; which does not use flexible or "wiggly" pipe sections to move the tool into the deviated section; which is light in weight; which is relatively inexpensive; and which can be "tripped" or moved in and out of the borehole quickly (compared to tripping the drill string in and out of the borehole). There is also a need for an apparatus and method which will allow a surveying instrument, logging instrument, or other downhole tool to be passed through the bore of a flexible drill pipe, particularly the wiggly pipe used for drilling short radius curves, and which will therefore not require the removal of the drill string from the borehole each time a survey, log, or other downhole operation is desired; which will allow the use of non-magnetic survey tools; which will allow surveys to be taken immediately above the drill bit as the drilling of the deviated section of the borehole progresses without removing the drill string and drill bit from the borehole; and which will allow the downhole reference point of the curve drilling assembly to be used for the survey without disturbing or requiring reestablishment of the reference point when the survey assembly is removed from the borehole.

Further, there is a need for a non-magnetic type surveying technique for use inside the drill string without removing it from the borehole when the bit is near steel casing.

SUMMARY OF THE INVENTION

The present invention is contemplated to overcome the foregoing deficiencies and meet the above-described needs. In order to accomplish this, the present invention provides a novel and improved apparatus and method for positioning a tool in the deviated section of a borehole.

The apparatus includes a flexible rod and positioning means. The flexible rod has sufficient length to extend from the vertical section into the deviated section of a borehole. The rod has an uphole end and a downhole end and the tool is connectable to the downhole end of the rod. Preferably, the rod is transversely flexible and torsionally inflexible.

The positioning means is connectable to the uphole end of the rod and is used for positioning the downhole end of the rod in the deviated section of the borehole when the positioning means and the uphole end of the rod are in the vertical section of the borehole. In one embodiment, the positioning means comprises biasing means, such as a weight, for urging the downhole end of the rod into the deviated section of the borehole.

In another embodiment, the positioning means comprises orienting means, such as a cam guide and cam, for rotationally orienting the rod in the borehole as the rod is lowered into the drill string. The orienting means is further defined as fixing the rotational orientation of the rod with respect to a predetermined point on the circumference of the drill string and as limiting the downhole travel of the rod as the rod is lowered into the borehole.

The method for positioning a tool in a deviated section of a borehole includes connecting the tool to the downhole end of a flexible rod; lowering the rod and tool into the borehole; and using the uphole end of the rod to position the tool and the downhole end of the rod in the deviated section of the borehole when the uphole end of the rod is in the vertical section of the borehole. The method also provides for removing a drill string from the borehole before lowering the rod and tool into the borehole.

The method of determining the direction of the borehole with nonmagnetic instrumentation without removing the drill string from the borehole includes establishing a reference mark on the surface of the drill string that is aligned with a reference mark above the deviated section of the hole; positioning a tool that includes at least 2-axis accelerometers near the bit; aligning these accelerometers with the downhole reference mark; recording the electrical output of the accelerometers; determining compass orientation of the surface reference mark; and finally calculating both the borehole inclination and direction from the accelerometer recordings and the orientation of the surface reference mark. The mathematical equations for such calculations are well known in the art.

In one embodiment of the invention, the using step of the method provides for using a weight connected to the uphole end of the rod to urge the downhole end of the rod into the deviated section of the borehole. A wire-like member may be connected to the uphole end of the rod to raise and lower the rod and tool in the borehole. The using step also provides for using a plurality of concatenated rod-like members, connected to the uphole end of the rod, to raise and lower the rod and tool in the borehole; and for selecting the weight of the rod-like members to urge the downhole end of the rod into the deviated section of the borehole.

In another embodiment, the using step of the method provides for rotationally orienting the rod and tool with respect to a predetermined point on the circumference of the drillstring as the rod is lowered into the drill string. The using step further provides for limiting the downhole travel of the rod as the rod is lowered into the drill string so that the uphole end of the rod remains in the vertical section of the borehole as the downhole end of the rod and tool are positioned in the deviated section. In this embodiment, the using step may comprise connecting a cam guide to one of the vertical section of the drill string or the uphole end of the rod; and connecting a cam to the other of the vertical section of the drill string or the uphole end of the rod in order to rotationally orient the rod and limit the downhole travel of the rod as the rod and tool are lowered into the borehole.

It is contemplated that the present invention will provide for rapid surveying and logging of highly deviated boreholes and short radius curves in boreholes.

It is contemplated that the present invention will provide a wireline surveying technique for open boreholes which reduces total surveying time by a factor of ten in shallow wells and potentially by many times this amount in deeper dells over the known surveying and logging apparatus and techniques.

It is contemplated that the present invention will significantly reduce the cost of equipment used to survey or log deviated boreholes by replacing wiggly or flexible pipe with fiberglass sucker rods.

It is contemplated that the present invention will provide an apparatus and method for surveying and logging deviated boreholes in which the wear and tear and potential loss of expensive, specialty, flexible pipe is circumvented by the use of common place, low cost sucker rods.

It is contemplated that the present invention will provide an apparatus and method for logging and surveying open or unlined boreholes in which the surveying or logging time is greatly reduced thereby reducing the likelihood of borehole collapse, sloughing, or settling of drill cuttings during the non-drilling periods.

It is contemplated that the present invention will provide a surveying and logging apparatus and method which is sufficiently quick and inexpensive that dummy runs (runs without a tool at the end of the downhole rod) can be made quickly prior to the surveying or logging run in order to ascertain the condition of the borehole and verify the ability to insert and retrieve the surveying or logging tool or instrument.

It is contemplated that the present invention will provide a surveying or logging apparatus and method in which surveying or logging mistakes or misruns (such as due to instrument malfunction) are easily remedied by the ability to readily rerun the instrument until satisfactory results are obtained; whereas repeated trips using the drill string and flexible pipe are not an economically viable option.

It is contemplated that the present invention will allow surveying the borehole through the drill string when the drill string is in close proximity of steel casing that would normally preclude the use of magnetic type instruments.

BRIEF DESCRIPTION OF THE DRAWINGS

The present invention will be better understood by reference to the examples of the following drawings.

DETAILED DESCRIPTION OF THE PREFERRED EMBODIMENTS

Figure 1:
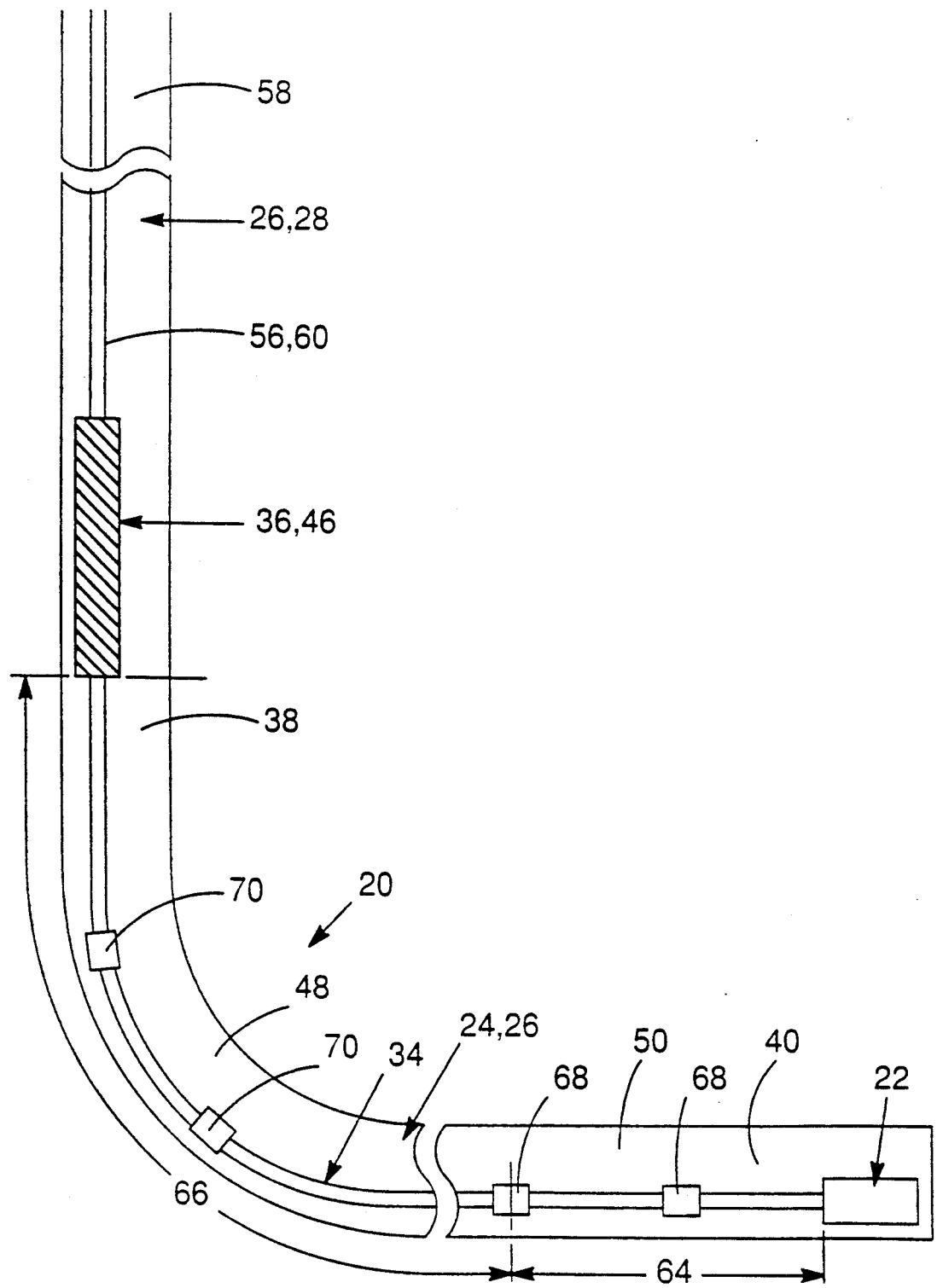
FIG. 1 is a schematic representation of an embodiment of the apparatus and method for positioning a tool in the deviated section of a borehole, and the biasing means, of the present invention.
Figure 2:
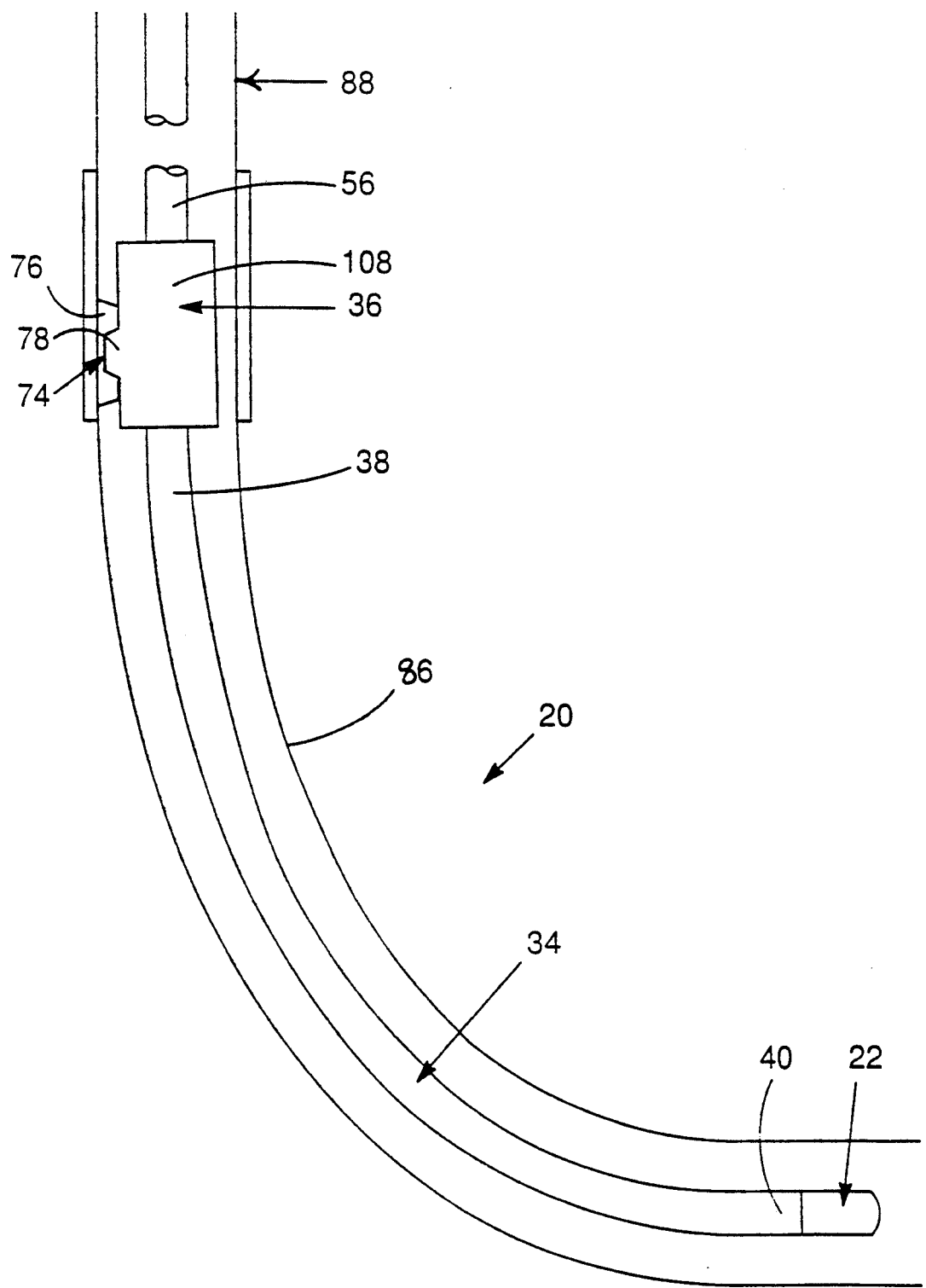
FIG. 2 is a schematic representation of an embodiment of the apparatus and method for positioning a tool in the deviated section of a borehole, and the orienting means, of the present invention.

FIGS. 1 and 2 present embodiments of an apparatus and method (hereinafter referred to collectively as "apparatus"), generally designated 20, for positioning a tool 22 in the deviated section 24 of a borehole 26. The borehole 26 includes an about vertical section 28 and a deviated section 24.

Referring to the example of FIGS. 1 and 2, the apparatus of the present invention may be generally described as comprising a flexible rod 34 and positioning means 36. The flexible rod 34 has sufficient length to extend from the vertical section 28 into the deviated section 24 of the borehole 26. The rod has an uphole end 38 and a downhole end 40. The tool 22 is connectable to the downhole end 40 of the rod 34. The positioning means 36 is connectable to the uphole end 38 of the rod 34 for positioning the downhole end 40 of the rod 34 in the deviated section 24 of the bore hole 26 when the positioning means 36 and the uphole end 38 of the rod 34 are in the vertical section 28 of the borehole 26.

Before proceeding, it should be understood that the apparatus 20 is described and will typically be used for positioning a tool 22, such as a surveying tool, logging tool or other downhole tool, collectively referred to as a "wellbore examination tool", in the borehole 26 of an oil or gas well, although it is intended to be understood that the apparatus 20 may be used to position virtually any type of tool 22 in a borehole 26 in virtually any type of environment or material, subterranean or otherwise. Similarly, to facilitate discussion, the borehole 26 and rod 34 are described as having an uphole and a downhole end, i.e., an uphole end adjacent the surface of the earth or the material in which the borehole 26 extends and a downhole end which is the end away from the surface, and the borehole 26 is described as having a vertical section 28. It is intended to be understood that the terms uphole, downhole, vertical, horizontal, etc., are used to facilitate description and are not intended as limitations.

Referring to the example of FIG. 1, in one embodiment of the present invention the positioning means 36 comprises biasing means 46 for biasing the downhole end 40 of the rod 34 into the deviated section 24 of the borehole 26. In a preferred embodiment, the biasing means 46 is a weight, also designated 46. The weight 46 should have sufficient mass to force or push the rod 34 and tool 22 into the deviated section 24 of the borehole 26. The deviated section 24 will normally include a curved section 48 and a lateral section 50. The weight 46 must have sufficient mass to bend or flex the rod 34 and force the rod 34 and tool 22 through the curved section 48 and into the lateral section 50.

A wire-line member 56 may be connected to the uphole end 38 of the rod 34. The wire-line member 56 is extendable from the uphole end 38 of the rod 34 for raising and lowering the rod 34 and tool 22 in the borehole 26, i.e., the wire-line member may be extended to the surface or uphole end 58 of the borehole 26 and attached to appropriate equipment for raising and lowering the rod 34 and tool 22. Preferably the wire-line member 56 is a conventional logging company electrical and lifting cable, as further discussed below.

In another embodiment, referring to the example of FIG. 1, the biasing means 46 comprises a plurality of concatenated rod-like members 60 which are connected to the uphole end of the rod 34 and which are extendable from the uphole end of the rod toward the uphole end 58 of the borehole 26 for raising and lowering the rod 34 and tool 22 in the borehole 26. The rod-like members 60 replace the wire-line member 56 and may also replace the weight 46 (although the rod-like members 60 with the weight 46). If the rod-like members 60 replace the weight 46 the rod-like members 60 should contain sufficient mass to force the rod 34 and tool 22 through the curved section 48, as previously discussed. Preferably, the rod-like members 60 include at least one weighted rod-like member, e.g., some of the rod-like members 60 may be fiberglass or aluminum with one or more of the rod-like members made of steel or equivalent heavier material.

Referring to the example of FIG. 1, in the prototype apparatus 20, the tool 22 is a conventional self-contained surveying instrument which carries a magnetic direction indicating instrument, such as a compass, an inclination indicating instrument, such as a plumb bob or level, and a camera (not illustrated). The surveying instrument 22 is inserted in a four foot long, non-magnetic, stainless steel carrier tube, also designated 22. The carrier tube and tool 22 are attached to the rod 34 by a first section 64 of rod 34 which typically includes several ⅝-inch diameter, non-magnetic, (such as 316 stainless steel) rods. The first section 64 of rod 34 should be long enough to prevent magnetic interference with the survey instrument 22 by the ferromagnetic components of the second section 66 of the rod 34, e.g., any steel sucker rod connectors, steel weight 46, etc., in the second section 66. The individual rods of the first section 64 should be threaded at both ends so that each pair of rods may be joined by non-magnetic, threaded bronze couplings 68, such as Ampco-45 couplings.

In a more preferred embodiment, the rods of the first section 64 are fiberglass sucker rods. The first section 64 fiberglass sucker rods are fitted with threaded connectors and couplings 68 made of non-magnetic, copper-beryllium alloy in order to eliminate the need for stainless steel rods 34. Normally, a length of at least 48 feet of non-magnetic rods 34 should be used in the first section 64 to distance the tool 22 from any ferromagnetic components of the rod 34 (assuming that a magnetic survey instrument 22 is used).

The second section 66 of rod 34, i.e., the section beyond the non-magnetic first section 64, is preferably composed of several 37.50-foot lengths of standard ¾-inch diameter fiberglass sucker rods. The preferred fiberglass sucker rods 34 only weigh about 0.50 pound per foot, are capable of bending around a five foot radius curve, and their tensile strength is rated at 14,000 pounds working load and 28,000 pounds peak static load. Threaded steel couplings 70 are attached to the ends of the fiberglass rods 34 in the second section 66 such that each adjoining pair of rods is connected by threaded steel couplings 70. The steel couplings 70 are capable of causing magnetic interference with the magnetic surveying instrument 22, and therefore the magnetic instrument 22 should be spaced apart from the sucker rods by at least 48 feet of non-magnetic rods 64, as previously mentioned. In the prototype, the total rod 34 weighs about 125 pounds. An equivalent length of wiggly pipe (which the rod 34 replaces) weighs 3,960 pounds.

Although the apparatus 20 of FIG. 1 will normally be used for surveying the lateral section 50 of a borehole 26, the apparatus 20 may be used in surveying or logging any section of a borehole 26. The apparatus 20 of FIG. 1 will typically be used open hole, i.e., in an unlined borehole 26 and without any extrinsic reference to the circumference of the borehole 26 or to a direction, i.e., north, south, east, west, on the surface of the earth. For this reason, the tool 22 will normally include a magnetic instrument, such as a magnetometer. As discussed above, magnetic instruments, such as magnetometers lose their accuracy in determining the direction of the earth's magnetic field inside or in close proximity to ferromagnetic materials and must therefore be sufficiently distanced from any ferromagnetic materials that the operation of the magnetic instrument is not impaired. The apparatus 20 of FIGS. 1 and 2 may be used inside a well casing, tubing, drill pipe, etc., as well as in close proximity to other ferromagnetic materials, if magnetic interference with the tool 22 is not a concern.

The total length of the rod 34 should be selected to be slightly longer than the length of the deviated section 24 of borehole 36, i.e., longer than the total length of the curved section 48 and the lateral section 50 of borehole 26. The length of the rod 34 should be such that the biasing means or weight 46 will remain in the vertical section 28 of the borehole 26. As previously mentioned, a conventional wireline 56 will normally connect the weight 46 and apparatus 20 to the surface of the earth. The uphole end of the wireline 56 will normally be spooled on a drum at or near the uphole end of the borehole 26. Normally, in subterranean drilling rigs, the wireline 56 will be spooled on a drum at or near the drilling rig floor (not illustrated).

The biasing means or weight 46 in the prototype apparatus 20 is comprised of a sinker bar or a length of rigid drill collar. It should be attached to the uphole end 38 of the rod 34 and should be kept above the kick off point, i.e., the point at which the deviated section 24 leaves or skews from the vertical section 28 of the borehole 26. The biasing means 46 is used to force the rods 34 around the curved section 48 into the lateral section 50. In extreme situations, where a very large weight 46 is required, conventional rod rollers may be employed to reduce the friction between the rod 34 and the wall of the borehole 26. In tests of the prototype apparatus, a 100 pound weight (a five-foot length of rigid drill collar) was not sufficient to force the surveying instrument 22 to the end of the lateral section 50, although the 100 pound weight was sufficient to repeatedly place the instrument 22 in the lateral section 50 about 65 feet beyond the end of the curved section 48, thereby indicating that the apparatus 20 was working. The apparatus 20 readily forced the surveying tool 22 to the end of the lateral section 50 with a 290 pound weight 46 (14.50 foot length of drill collar) at the uphole end 38 of the rod 34.

As previously mentioned, the wireline 56 may be replaced with rod-like members 60. Preferably, the rod-like members 60 are fiberglass sucker rods or a combination of fiberglass sucker rods with standard steel sucker rods. Using sucker rods 60 allows the apparatus 20 to be tripped or conveyed in and out of the borehole 26 in about half the time required to handle a drill string. If lightweight fiberglass sucker rod 60 are used, the biasing means or weight 46 may be required to force the survey instrument 22 to the end of the lateral section 50. As previously mentioned, some of the lightweight fiberglass rods 60 may be replaced with steel rods or weighted rods in order to eliminate the need for the weight 46.

The apparatus 20 of FIG. 1 may also be applied to the logging of highly deviated boreholes 26. Assuming that logging instrumentation, e.g., gamma ray, resistivity, or sonic instrumentation, can be configured into short, small diameter, and/or flexibly coupled tools 22 capable of passing through the curved section 48 of borehole 26, conveyance of these logging tools 22 by the apparatus 20 will provide a cost effective method for collection of logging data.

The transmission of electrical signals to and from the surveying or logging instrumentation, or other tools 22, to the surface or uphole end 58 of borehole 26 through the rods 34, 60 may be accomplished in several ways. Hard wire conductors (not illustrated) may be connected to the exterior of the rods 34, 60 for their entire length, i.e., from the tool 22 through a bore in the weight 46 to an electrical connector on wireline 56 (wire-line 56 may include an electrical conductor) or to a hard wire conductor (not illustrated) on rod 60. Alternatively, since fiberglass sucker rods are manufactured from bundles of fibers, some of the fibers may be replaced with wires embedded in the rod body, which will provide better protection for the conductors in the borehole 26. The electrical connections between the rods 34, 60 may be recessed into the steel rod connectors/couplings 68, 70 as required to be quickly assembled and made waterproof.

In another embodiment, the apparatus 20 of FIG. 1, may incorporate a downhole memory (not illustrated) in a logging or surveying instrument 22. Single conductor, wire-line cable may be used to power the tool 22 and the downhole memory, thereby simplifying the process by eliminating the need for multi-conductor cable and connectors. Alternatively, if batteries of suitable power capacity can be packaged within the instrument 22 to power the memory, the apparatus may be further simplified by eliminating the need for electrical conductors from the surface or uphole end 58 of the borehole 26 to the logging instrument 22.

Referring to the example of FIG. 1, in another embodiment, the tool 22 may be a core container retrieving tool 22. In the past, it has been necessary to lift the drill string until a core container, i.e., a container used to take a core sample of the borehole (not illustrated), is in the vertical section 28 of the borehole 26 before a container retrieving tool 22 could be lowered on a wire line 56 to retrieve the container. The apparatus 20 of FIG. 1 may be used to force a core container retrieval tool 22 into the lateral section 50 of a borehole 26 in order to retrieve a core container and thereby eliminating the need to lift or move the drill string.

Referring to the example of FIG. 2, in another embodiment, the positioning means 36 comprises orienting means 74 for rotationally orienting the rod 34 in the drill string 86 as the rod 34 is lowered into the drill string 86. Preferably, the orienting means 74 is further defined as fixing the rotational orientation of the rod 34 with respect to a predetermined point on the circumference of the drill string 86 and as limiting the downhole travel of the rod 34 as the rod 34 is lowered into the drill string.

More preferably, the orienting means 74 includes a cam guide 76 connected to one of the vertical section 88 of the drill string 86 and the uphole end 38 of the rod 34; and a cam 78, connected to the other of the vertical section 28 of the drill string 86 and the uphole end 38 of the rod 34. The cam 78 automatically engages the cam guide 76 as the rod 34 is lowered into the drill string 86 in order to rotationally orient the rod 34 and to limit the downhole travel of the rod 34 with respect to the cam guide 76.

The tool 22 of FIG. 2 is a borehole surveying instrument consisting of one or more inclinometers. In the prototype apparatus 20 of FIG. 2, the tool 22 is a bi-axial accelerometer 22, although other forms of inclinometers may be used. The accelerometer 22 is used with the apparatus 20 of FIG. 2 to determine the inclination and direction of the deviated section 24 of the borehole 26. Preferably, the accelerometer 22 is a three-axis (tri-axial) unit in order to provide greater accuracy, i.e., the third axis is used to give a greater and more accurate response in deviated sections 24 of boreholes 26 which approach horizontal inclination.

The accelerometer 22 is connected to the downhole end 40 of rod 34. Since accelerometers require electrical power, the rod 34 should include an electrical conductor (not illustrated) passing through the interior or core of the rod 34 or connected to the outside of the rod 34. In order to prevent damage to the electrical conductor, it is preferable to pass it through the interior of the rod 34.

Figure 3:
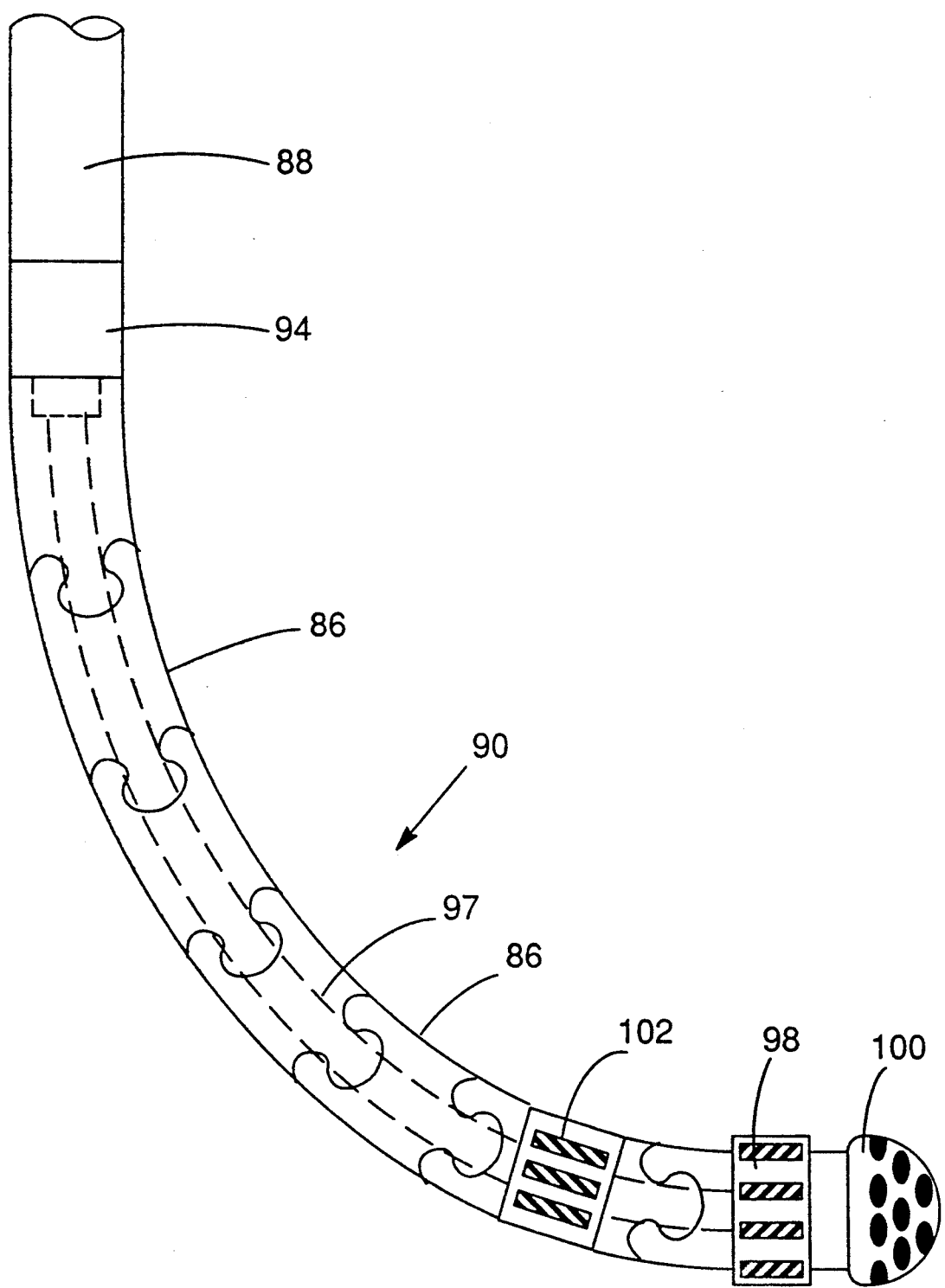
FIG. 3 is a schematic representation of a conventional curve drilling assembly.

The prototype apparatus 20 of FIG. 2 is designed for use with a conventional curve drilling assembly 90, illustrated in FIG. 3. The curve drilling assembly 90 is connected to drill collar 92 which in turn connects the curve drilling assembly 90 to the drill pipe (not illustrated), all of which are collectively referred to as the drill string, as is well known. Mule shoe sub 94 is connected between the drill collar 92 and the flexible pipe, commonly known as wiggly pipe 96, of the curve drilling assembly 90. The wiggly pipe 96 is lined with a hose 97 to prevent fluid leakage from the interior to the exterior of the wiggly pipe 96. Typically a bit body reamer 98 and drill bit 100 are provided at the lower end of the curve drilling assembly 90. The length of the curve drilling assembly is selected so that the mule shoe sub 94 and the drill collar 92 remain in the vertical section 28 of the borehole 26 as the drill bit progresses in drilling the curved section of the borehole. Razorback and eccentric collar 102 or an equivalent kick off device are used to steer the drill bit 100 in drilling the deviated section 24 of the borehole 26.

The mule shoe sub 94 is standard equipment with a conventional curve drilling assembly 90. The mule shoe sub 94 typically includes a pin or cam guide 76 (best seen in FIG. 2) so that a tool having a mating cam 78 may be lowered through the drill string into the mule shoe sub 94 and will be automatically turned to a predetermined rotational orientation with respect to the cam guide 76. A device such as a gyroscope having a cam 78 can be lowered into the drill string and mule shoe sub 94 to determine the rotational orientation of the mule shoe sub 94 in the borehole 26. Once the rotational orientation of the mule shoe sub 94 is determined, the apparatus 20 of FIG. 2 can be lowered through the drill string until the cam 78 mates with the cam guide 76 of the mule shoe sub 94 and the rotational orientation of the apparatus 20 and accelerometer 22 will be known. Also, once the initial orientation with the gyroscope is accomplished, a reference mark can be made on the drill string at the surface of the earth so that the apparatus 20 may be repeatedly tripped in and out of the drill string 86 without reestablishing the orientation of the mule shoe sub 94 with the gyroscope. Once the reference mark is placed at the surface of the earth, it may be monitored and transferred along the length of the drill string by known devices.

As previously mentioned, normally the cam guide 76, which is a key or pin, is located in the mule shoe sub 94. The cam 78 is located on the outside surface of the positioning means 36. In the prototype, the cam 78 is a key way or slot having a wide tapered mouth at the bottom which tapers to a point at the top or uphole end of the positioning means 36. The lower end of the key way or slot of the cam 78 extends 360° around the outside surface of the positioning means 36 so that the slot will automatically engage the cam guide 76 as the apparatus 20 is lowered into the mule shoe sub 94.

In the prototype apparatus 20 of FIG. 2, the length of the rod 34 is chosen so that the accelerometers 22 are positioned at the bit body reamer 98 when the orienting means 74 is adjacent the mule shoe sub 94. The cam 78 is built into the outside surface of the positioning means 36 and, as the rod 34 and accelerometer 22 are lowered into the curve drilling assembly 90 the cam 78 automatically engages the cam guide 76 (on the inside of the mule shoe sub 94) in order to rotationally orient the rod 34 and accelerometer 22; to fix the rotational orientation of the rod 34 and the accelerometer 22 with respect to the cam guide 76; and to limit the downhole travel of the rod 34 and accelerometer 22 as the rod 34 is lowered into the curve drilling assembly 90. The rotational orientation of the accelerometers with respect to the rod 34 and cam 78 are determined and fixed before lowering the apparatus 20 into the curved drilling assembly 90. The rod 34 should be transversely flexible and torsionally rigid or inflexible to minimize twisting of the rod 34. When the apparatus 20 is lowered into the curve drilling assembly 90, it is advisable to pick up the apparatus 20 and lower it several times to ensure that the rod 34 is not twisted. Any twisting of the rod between the orienting means 74 and the tool 22 will reduce the accuracy of the accelerometer's orientation in the borehole 26 and any data derived from the accelerometer 22. This procedure provides an accelerometer orientation that is known with respect to the surface drill string orientation mark.

The maximum diameter of the rod 34 and accelerometer 22 is selected to freely pass through the internal diameter of the hose 97 and wiggly pipe 96, which is normally approximately one inch for short radius curve drilling assemblies 90.

In the prototype apparatus 20 of FIG. 2, the uphole end 38 of rod 34 is connected to the positioning means 36 and orienting means 74. Preferably, the positioning means 36 includes a large diameter case or housing 108 that can house batteries, electronics, and a standard surveying timer and camera (not illustrated). The prototype electronics include a power supply, conditioning circuits for the accelerometers and a multiplexing circuit for transmitting data up wireline 56. Alternately, the data may be recorded downhole by using a digital display for each of the accelerometers, i.e., for each axis of the accelerometer 22. The digital displays may be mounted on a single circular disk and are of a size similar to those used in digital wristwatches. A survey camera may be mounted immediately above the digital display so that the display can be photographed at various times determined by the survey timer. The survey camera can be either a single shot unit or a multishot unit depending upon whether a single survey or multiple surveys are desired each trip into the borehole 26.

As previously mentioned, the exterior of the housing 108 includes the cam 78 which seats over the cam guide 76 in the mule shoe sub 94. Since the orientation of the mule shoe sub 94 and cam guide 76 are known from the surface mark on the drill pipe at the surface of the earth and the orientation of the accelerometer 22 is known with respect to the cam guide 76 once the cam 78 is seated in the mule shoe sub 94, the direction and inclination of the deviated section 24 of the borehole 26 can be calculated from the accelerometer readings and known accelerometer orientations. The equations used to calculate the direction and inclination of the deviated section 24 of the borehole 26 are the same as those used with a conventional measurement-while-drilling system, except that the accelerometer directional orientation is determined from the cam guide 76 orientation rather than from a magnetometer reading of the earth's magnetic field.

A pressure switch (not illustrated) may also be incorporated into the mule shoe sub 94 in order to provide a positive indication that the housing 108 and cam 78 are properly seated in the mule shoe sub 94 and cam guide 76 when the accelerometer readings are recorded.

Using the prototype apparatus 20 of FIG. 2, the inclination and direction of the deviated section 24 can be determined at any point during the curved drilling operation by simply running the apparatus 20 inside the drill string and curve drilling assembly 90. If more than one reading or measurement is desired, e.g., at various places or stations in the borehole 26 the drill string and apparatus 20 can be moved with the apparatus 20 seated in the mule shoe sub 94 and a multishot survey conducted in the conventional manner. The surface orientation of the drill string must be determined accurately at each station, i.e., at each point that measurements are taken, in order to determine the directional orientation of the accelerometers (which should have been previously established, as discussed above). The orientation of the drill pipe may be determined using conventional devices to determine the angular orientation of the surface mark relative to True North.

The apparatus 20 of FIG. 2 may also be used for surveying in an extended lateral section 50 of a borehole 26 by adding sections to the rods 34 that connect the housing 108 to the tool 22. The added connecting rods 34 must include waterproof electrical contacts, precise orientation means, and adequate mechanical strength and torsional rigidity. It should be noted that the accuracy of the directional portion of the survey measurements using an accelerometer will degrade as the length of rod 34 is increased (due to increased likelihood of twisting in the rod 34) but the inclination measurements will not degrade.

The apparatus 20 of FIG. 2 may be constructed utilizing "off the shelf" low cost components. The survey camera may be replaced by an electronic memory and a timing circuit. This in fact may be a preferred way to build the apparatus 20, assuming the cost is competitive. Information from the memory may be transmitted to the surface via a conducting wireline 56 or via an electrical conductor through concatenated rod-like members 60 (best exemplified in FIG. 1) or may be stored until the apparatus 20 is removed from the borehole 26.

Although the apparatus 20 of FIG. 2 will normally be used inside of a drill string to survey short radius curves in boreholes, it may be used in an open or unlined borehole 26. If it is used in an open borehole 26, the mule shoe sub 94 will not be available to reference the apparatus 20, and a magnetometer or equivalent direction measuring device must be added to the accelerometer 22. Alternatively, a self-contained tool 22 which houses a direction finding instrument, inclination measuring instrument, and a camera or other recording device may be used, as discussed above with the embodiment of FIG. 1.

The biasing means or weight 46 described with the embodiment of FIG. 1 may be used with the apparatus 20 of FIG. 2 in a similar manner and for similar purposes as described above with FIG. 1.

While presently preferred embodiments of the invention have been described herein for the purpose of disclosure, numerous changes in the construction and arrangement of parts and the performance of steps will suggest themselves to those skilled in the art, which changes are encompassed within the spirit of this invention as defined by the following claims.

What is claimed is:

1. A method of determining inclination and compass direction of a deviated section of a subteranean wellbore without removing a drillstring disposed therein, the method comprising the steps:

(a) positioning an inclinometer portion of a wellbore examination tool at a known rotational orientation within a drillstring in a deviated section of a subterranean wellbore, said wellbore examination tool comprising an electronics housing connected to an uphole end of torsionally rigid positioning means, said inclinometer portion being connected to a downhole end of said torsionally rigid positioning means, said electronics housing being rotationally oriented within the drillstring above said deviated section of said subterranean wellbore at a mule shoe sub having a known compass heading, said downhole end of said torsionally rigid positioning means and said inclinometer portion extending into said deviated section of said subterranean wellbore; and (b) using said known rotational orientation of said inclinometer portion of said wellbore examination tool and output from said inclinometer portion for calculating inclination and compass direction of said deviated section of said subterranean wellbore.

2. The method of claim 1, in which said inclinometer portion of said wellbore examination tool of step (a) comprises a plurality of accelerometers.

3. A method of determining the inclination and compass direction of a deviated section of a subterranean wellbore without removing a drillstring disposed therein, the method comprising the steps:

(a) establishing a downhole reference location on an interior surface of a drillstring above the deviated section;

(b) determining the compass heading of the downhole reference location;

(c) lowering a torsionally rigid positioning means into the drillstring for orienting an electronics housing connected to an uphole end of the positioning means at the downhole reference location and for extending a downhole portion of the positioning means and the inclinometer portion attached thereto into the deviated section of the subterranean wellbore at a known rotational orientation; and (d) using the known rotational orientation of the inclinometer portion of the wellbore examination tool and output from the inclinometer portion for calculating inclination and compass direction of the deviated section.

4. A method of claim 3 which comprises determining the compass heading of the downhole reference location with a downhole tool.

5. A method of claim 4 in which the downhole tool is a gyroscope.

6. A method of claim 3 which comprises determining the compass heading of the downhole reference location by monitoring a surface reference location established at a known rotational orientation with respect to the downhole reference location.

* * * * *